United States Patent
Sharifian et al.

(10) Patent No.: US 11,601,260 B1
(45) Date of Patent: Mar. 7, 2023

(54) ENCRYPTION/DECRYPTION USING KEY ENCAPSULATION/DECAPSULATION

(71) Applicant: UTI LIMITED PARTNERSHIP, Calgary (CA)

(72) Inventors: Setareh Sharifian, Calgary (CA); Reyhaneh Safavi-Naeini, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 0 days.

(21) Appl. No.: 17/514,762

(22) Filed: Oct. 29, 2021

(51) Int. Cl.
  *H04L 9/08* (2006.01)
  *H04L 9/06* (2006.01)

(52) U.S. Cl.
  CPC .......... *H04L 9/0825* (2013.01); *H04L 9/0618* (2013.01); *H04L 9/0869* (2013.01)

(58) Field of Classification Search
  CPC ... H04L 9/0825; H04L 9/0618; H04L 9/0869; H04L 9/08; H04L 9/06
  See application file for complete search history.

(56) References Cited

U.S. PATENT DOCUMENTS

| | | | |
|---|---|---|---|
| 11,431,498 B2 * | 8/2022 | Goncalves | H04L 9/3236 |
| 2016/0080144 A1 | 3/2016 | Choi et al. | |
| 2019/0036678 A1 * | 1/2019 | Ahmed | H04L 9/302 |
| 2022/0253540 A1 * | 8/2022 | Xu | G06F 21/6245 |

FOREIGN PATENT DOCUMENTS

| | | |
|---|---|---|
| CA | 2337306 A1 | 9/2001 |
| CN | 107483383 A | 12/2017 |
| WO | 2019157816 A1 | 8/2019 |

OTHER PUBLICATIONS

R. Cramer and V. Shoup, "Design and analysis of practical public-key encryption schemes secure against adaptive chosen ciphertext attack," SIAM Journal on Computing, vol. 33, No. 1, pp. 167-226, 2003.
P. W. Shor, "Polynomial-Time Algorithms for Prime Factorization and Discrete Logarithms on a Quantum Computer," SIAM Journal on Computing, vol. 26, No. 5, pp. 1484-1509, Oct. 1997.
Y. Ishai, E. Kushilevitz, S. Meldgaard, C. Orlandi, and A. Paskin-Cherniavsky, "On the power of correlated randomness in secure computation," in Theory of Cryptography Conference. Springer, 2013, pp. 600-620.

(Continued)

*Primary Examiner* — Quazi Farooqui
(74) *Attorney, Agent, or Firm* — Brion Raffoul

(57) ABSTRACT

Systems and methods relating to the encryption and decryption of messages to be sent through a communications link. The system and method uses a random data source at the receive and transmit sides, along with a trusted random sampler that produces correlated random samples from the random data source to be used at the send and receive sides. At the transmit side, the correlated random sample is used to generate a symmetric key as well as a ciphertext. The symmetric key is then used to encrypt the message. The ciphertext is transmitted, along with the encrypted message, to the receive side. The receive side then uses the ciphertext, along with its own correlated random sample, to recover the symmetric key. The symmetric key is then used to decrypt the encrypted message.

6 Claims, 4 Drawing Sheets

(56) References Cited

OTHER PUBLICATIONS

U. M. Maurer, "Secret key agreement by public discussion from common information," IEEE Trans. Inf. Theory, vol. 39, No. 3, pp. 733-742, May 1993.
R. Ahiswede and I. Csiszar, "Common randomness in information theory and cryptography. I. Secret sharing," IEEE Trans. Inf. Theory, vol. 39, No. 4, pp. 1121-1132, Jul. 1993.
S. Sharifian, A. Poostindouz, and R. Safavi-Naini, "A capacity-achieving one-way key agreement with improved finite blocklength analysis, (in proceedings of isita 2020)," in 2020 International Symposium on Information Theory and Its Applications (ISITA). IEEE, 2020.
J. Hastad, R. Impagliazzo, L.A. Levin, and M. Luby. Construction of pseudo-random generator from any one-way function. SIAM Journal on Computing, 28(4):1364-1396, 1999.
International Search Report issued by the ISA/CA for corresponding International Application No. PCT/CA2022/051596, dated Dec. 13, 2022.

\* cited by examiner

ENCRYPTION/DECRYPTION USING KEY ENCAPSULATION/DECAPSULATION

TECHNICAL FIELD

The present invention relates to communications. More specifically, the present invention relates to systems and methods relating to encrypted communications.

BACKGROUND

The communications revolution of the early 21st century has led to an explosion in the amount of data being transferred between people. Concomitant with this explosion in communications volume is an increasing interest in privacy as people seek to keep their communications private from prying eyes. Multiple encryption schemes exist to ensure that communications are kept private between communicating parties.

Public-key encryption (PKE) schemes are usually defined for restricted message spaces and so the ciphertext can hide a limited number of plaintext bits. A Hybrid encryption scheme [R1] consists of a public-key part and a (symmetric) secret-key part. The public-key part is called the key encapsulation mechanism (KEM) and generates a pair: (i) a random symmetric key K, and (ii) a ciphertext C. The symmetric key part uses the generated key K to encrypt the actual data and obtains the corresponding ciphertext C' using an efficient data encapsulation mechanism (DEM) (that can be constructed using, for example, AES in counter mode). The pair (C,C') allows the decryptor to first recover K from C, and then use it to decrypt C' to obtain the data.

Today's main constructions of KEM rely on the hardness assumption of two computational problems, discrete logarithm (DL) and integer factorization problems, both with known efficient quantum algorithms by Shor [R2]. KEMs that remain secure in presence of quantum computers are called post-quantum secure, and have been constructed using hard problems in areas such as lattices or algebraic codes for which efficient quantum algorithms are not known.

These constructions, in many cases, require high computation and communication cost and in all cases need to update their parameters with advances in computing and security technologies (e.g., updating parameters when new algorithms and attacks are found). Post-quantum security of hybrid encryption systems is primarily determined by the post-quantum security of the KEM because DEM is constructed using a symmetric key encryption system that can be designed to have security not significantly impacted by quantum computers (for example, one needs to double the key size of AES).

This highlights a need for new systems and methods for encryption that operate with post-quantum security between parties.

SUMMARY

The present invention provides systems and methods relating to the encryption and decryption of messages to be sent through a communications link. The system and method use a random data source and a trusted sampler that produces correlated random samples X and Y from the random data source. The sample X is then provided to the transmit side and the sample Y is provided to the receive side. The adversary also receives some side information that is shown as a correlated variable Z. At the transmit side, the correlated random sample X is used to generate a symmetric key as well as a ciphertext C. The symmetric key is then used to encrypt the message. The ciphertext C is transmitted, along with the encrypted message, to the receive side. The receive side then uses the ciphertext C, along with its own correlated random sample Y, to generate the symmetric key. The symmetric key is then used to decrypt the encrypted message.

In a first aspect, the present invention provides a method for encrypting and decrypting a message, the encrypting method comprising:
a) sampling a random data source to result in a pair of correlated random samples from said random data source;
b) sending a first one of said pair of correlated samples to an encapsulation module to generate a symmetric key and a ciphertext; and
c) encrypting said message using said symmetric key to result in an encrypted message;
wherein the decrypting method comprises:
a1) sending a second one of said pair of correlated samples and said ciphertext to a decapsulation module to recover said symmetric key;
b1) decrypting said encrypted message using said recovered symmetric key.

In a second aspect, the present invention provides a system for encryption/decryption of a message, the system comprising:
a random data source sampler for sampling a random data source to produce a pair of correlated samples;
an encapsulation module for receiving a first one of said pair of correlated samples and for generating a symmetric key and a ciphertext using said first one of said pair of correlated samples;
a decapsulation module for recovering said symmetric key using said ciphertext and a second one of said pair of correlated samples;
an encryption module for encrypting said message to produce an encrypted message, said message being encrypted using said symmetric key;
a decryption module for decrypting said encrypted message, said encrypted message being decrypted using said symmetric key after said symmetric key has been recovered by said decapsulation module.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
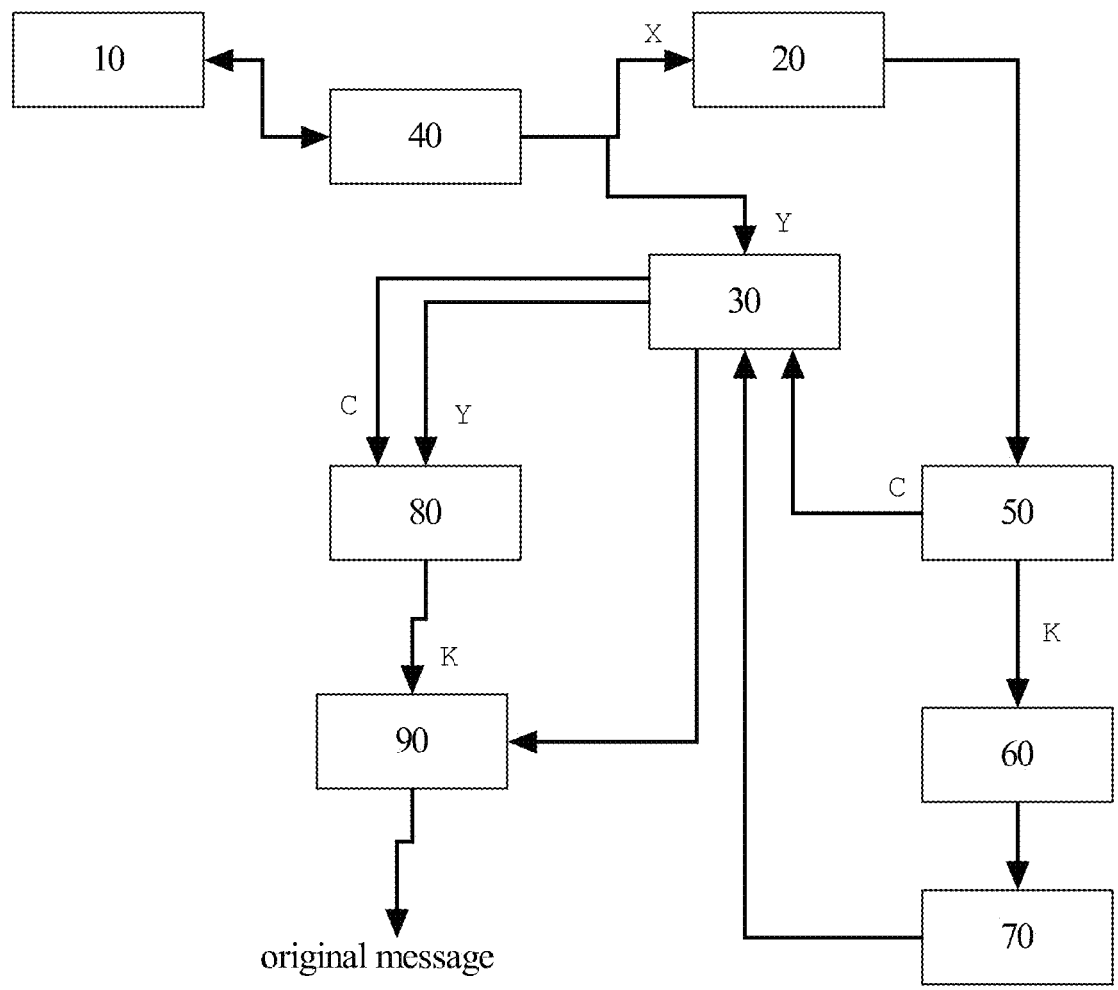
FIG. 1 is a schematic block diagram explaining the present invention.

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

The present invention relates to an encryption/decryption scheme that uses a random data source that produces pairs of correlated samples that are made available respectively to sender and receiver and which can be used to generate a symmetric key for encrypting/decrypting communications between the sender and receiver. To generate the symmetric key, the sender uses an individual sample X (the first one of a pair of correlated samples) that is sampled from the random data source (i.e., a private input from the sender). This results in a ciphertext C and the symmetric key K. The symmetric key K is then used to encrypt the plaintext to be transmitted to the receiver. The encrypted message can then be transmitted to the receiver along with the ciphertext C. Once received by the receiver, the receiver then retrieves the symmetric key K by using the ciphertext C and his own individual sample Y (the second one of the pair of correlated samples) from the random data source (i.e., his own private input). The retrieved symmetric key K is then used to decrypt the encrypted message from the sender.

In the following discussion, the parties in communication may be referred to as Alice, Bob, and Eve, with Alice being the sender, Bob being the receiver, and Eve being an eavesdropper to the communications between the sender and the receiver.

It should be clear that the random data source produces a joint distribution and, while the random data source is theoretically public, the samples are private inputs for the users (i.e., the sender and receiver). The present invention's scheme allows a sender and a receiver to use their samples of correlated randomness (from the random data source) and by the sender sending a single message to the receiver, obtain a shared key that is secure against an eavesdropper (e.g., a wiretapper) with the side information that is represented by its initial random sample.

In other words, the present invention samples a public distribution $P_{XYZ}$ and gives the samples X, Y, and Z to Alice, Bob and Eve, respectively. This setting is known as the satellite setting [R4], where a satellite broadcasts a random beacon that is received by protocol parties through their (independent) noisy channels. In one embodiment of the present invention, a one-way two-party key agreement in which Alice sends a single message to Bob is used as a KEM, which together with a DEM can provide a hybrid encryption scheme with post-quantum security. Intuitively, using an information-theoretically secure KEM will establish a key whose security will not depend on the computational power of the adversary, and since the DEM component that is implemented using an algorithm such as AES-256, will be safe against quantum computers, the combination of the two will provide post-quantum security.

The present invention uses private randomness samples (correlated random variables) of Alice and Bob to establish a shared key and, as such, is neither fully a public-key, nor a symmetric key system (which would require a shared secret key before the scheme is used) but will use private correlated samples of the two parties to establish a shared key.

Referring to FIG. 1, a schematic illustration of aspects of the present invention is provided. A random data source 10 is accessible to both sender 20 (Alice) and receiver 30 (Bob). A trusted sampler process 40 is used to sample the random data source to produce a pair of correlated random values from the random data source. The trusted sample process produces a pair of correlated samples X and Y. For Alice, the correlated random value is X while, for Bob, the correlated random value is Y. Alice then uses X with an encapsulation function 50 to produce a value C and a symmetric key K. The value C operates as the ciphertext C in the scheme. The symmetric key K is then used with an encryption function 60 to encrypt the message to Bob, thereby producing encrypted message 70.

Once the encrypted message 70 has been produced, this, along with the value or ciphertext C, is transmitted to Bob. Bob can then use a decapsulation function 80 with his correlated random value Y and the value/ciphertext C to recover/reproduce the symmetric key K. The symmetric key K and the encrypted message 70 are then run through a decryption function 90 to produce the original message from Alice.

As can be imagined, the present invention uses a one-way secret key agreement scheme [R5]. In the initial setup of a one-way secret key agreement scheme, Alice, Bob and Eve have instances of random variables X, Y and Z that are correlated through a public distribution $P_{XYZ}$. These random variables represent private inputs of Alice and Bob, and the side-information of Eve, respectively. The key agreement is achieved by Alice sending a single message to Bob. In one scheme, a one-way secret-key agreement protocol is defined using three parameters: a security parameter $\lambda$, the secret key length l, and the number of instances of the initial random variables used n, where, for given l and $\lambda$ values, n can be computed by a function $n(\lambda, l)$. The goal of secret-key agreement is to establish a key $k=k_A=k_B$ that appears uniformly random to Eve, where $k_A$ is the derived key by Alice and $k_B$ is the derived key by Bob.

It should be clear that a process that generates a pair of correlated variables X and Y for Alice and Bob is used with the present invention. Random data sources such as atmospheric data or sun spots may be used in this process. As an example, a satellite broadcasts a random string and Alice and Bob receives this string through their respective receivers. The same random data source with a known probability distribution will be used to generate the correlated sampled of Alice and Bob, as well as the leakage variable Z.

In terms of implementing the various functions used in the present invention as well as the sampler process and the data set, a number of points must be kept in mind.

For the present invention, a number of algorithms or methods are used. Specifically, these are the correlated sample generation algorithm, the encapsulation algorithm, and the decapsulation algorithm. These may be defined as below. For greater clarity, [R6] may be consulted.

Let $P_{XYZ}$ denote the public distribution that is used to generate correlated samples (values) of X, Y and Z, and let $\{h_s: X \to \{0,1\}^l\}_{s \in S}$ and $\{h'_{s'}: X \to \{0,1\}^l\}_{s' \in S'}$ be two strong universal hash families (UHFs) with parameters as defined below. Let $C=\{0,1\}^l \times S \times S'$ and $K=\{0,1\}^l$ denote the sets of ciphertexts and keys, respectively.

Let $\{h_s: X \to \{0,1\}^l\}_{s \in S}$ and $\{h'_{s'}: X \to \{0,1\}^l\}_{s' \in S'}$ be two strong universal hash families (UHFs).

The three algorithms for the present invention are as follows.

Generation algorithm $Gen(1^\lambda, P_{XYZ})$: For a distribution $P_{XYZ}$, a trusted sampler samples the distribution independently n times, and gives the triplet vectors x, y and z of correlated samples, privately to Alice, Bob and Eve, respectively. It should be clear that t and t are both functions of $\lambda$ and are parametrized by $P_{XYZ}$, the input probability distribution data set.

That is, $(x,y,z)=(x^n, y^x, z^n) \leftarrow^\$ Gen(1^\lambda, P_{XYZ})$.

Encapsulation algorithm Enc(x): The encapsulation algorithm Enc(•) takes as input x, samples s'←$ S' and s←$ S for the seed of the strongly universal hash functions, and generates the key k=h'$_{s'}$(x) and the ciphertext c=(h$_s$(x), s', s), Thus (c, k)=((h$_s$(x), s', s), h'$_{s'}$(x))←$ Enc(x).

Decapsulation algorithm Dec(y, c): The decapsulation algorithm Dec(•, •) takes the private input of Bob, y, and the ciphertext (h$_s$(x), s, s) as input, and outputs the key hs'(x) or ⊥. We have:

$$k=(h'_{s'}(x))\leftarrow Dec(1^\lambda, y, (h_s(x), s', s)).$$

The decapsulation algorithm works as follows:

1) Parses the received ciphertext to (g, s', s), where g is a t-bit string.
2) Defines the set, $$T(X|y)^\Delta = \{x: -\log P^n_{X|Y}(x|y) \leq v\},$$

and for each vector x̂ ∈ T (X|y), checks g=$^?$ h$_s$(x̂).
3) Outputs x̂ if there is a unique value x that satisfies g=h$_s$(x̂); Else outputs ⊥.

The value v depends on the correlation of x and y where higher correlation corresponds to smaller v, and a smaller set of candidates.

If successful, the decapsulation algorithm outputs a key k=h'$_{s'}$(x̂); otherwise it outputs ⊥.

For clarity, the sampler that samples the data set can be a randomness sampler. A randomness extractor maps a random variable with guaranteed min-entropy to a uniformly distributed random variable from a smaller set such that the two variables have small statistical distance. A random source is a random variable with lower bound on its min-entropy. We say a random variable X defined over {0, 1}$^n$ is an (n, d)-source if H$_\infty$(X)≥d.

A well-known construction of randomness extractors uses Universal Hash Families (UHF) whose randomness property is given by the Leftover Hash Lemma (LHL). The present invention may use a variation of the LHL, called the generalized LHL (For further background, [R7] may be consulted).

Figure 2A:
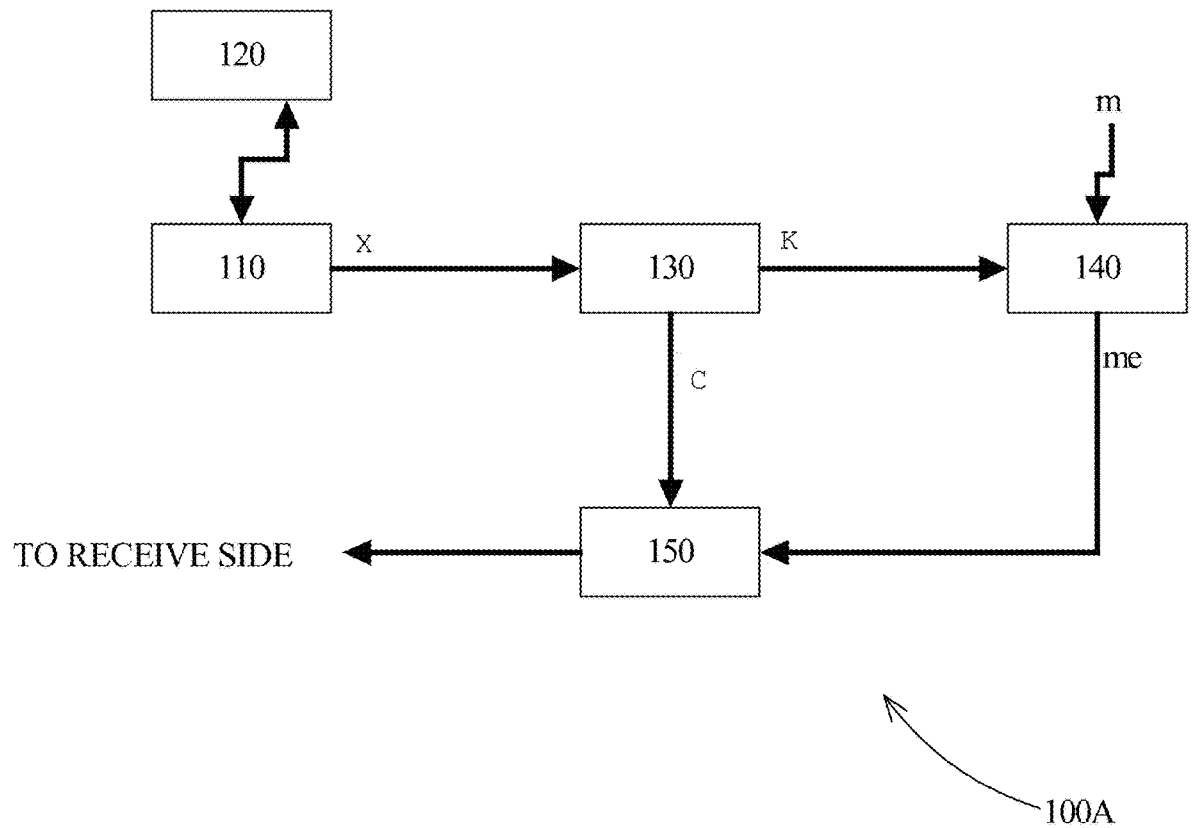
FIG. 2A is a block diagram of a transmit side of a system according to one aspect of the present invention.
Figure 2B:
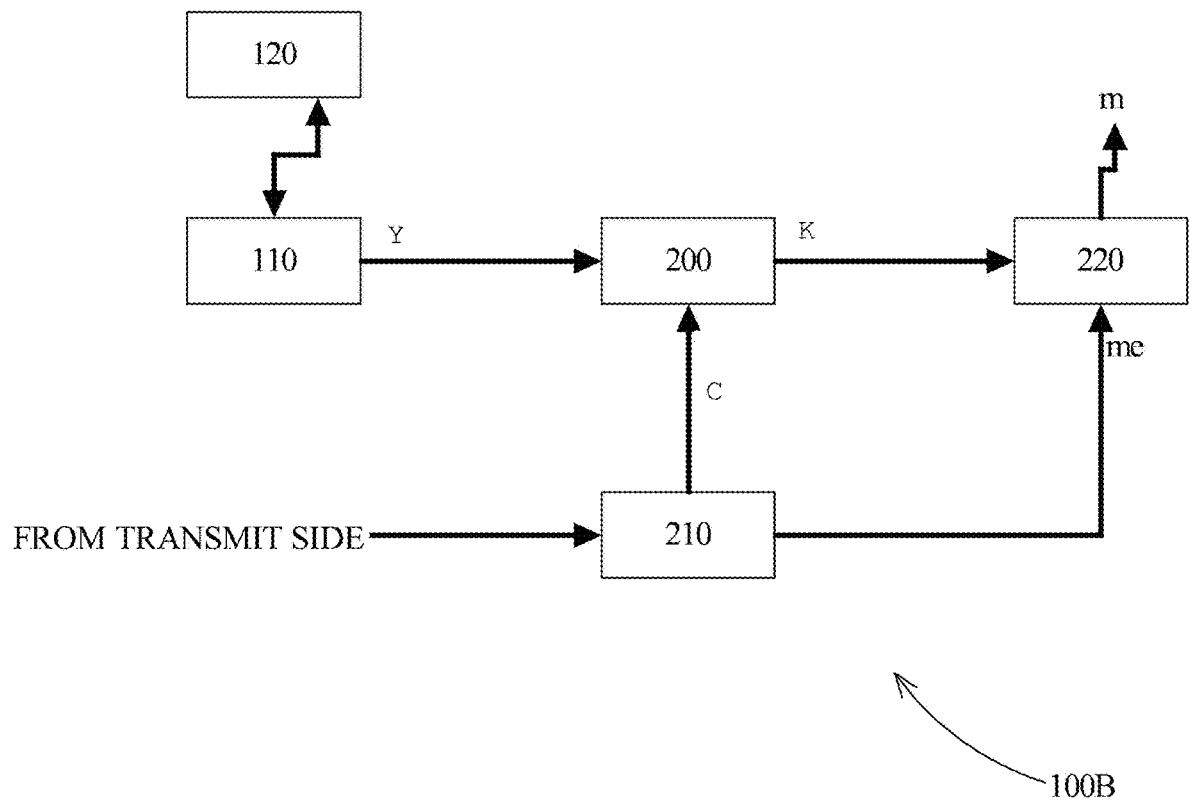
FIG. 2B is a block diagram of a receive side of a system according to one aspect of the present invention.

In one implementation, a system according to one aspect of the present invention is illustrated in FIG. 2A. It should be clear that FIG. 2A illustrates the transmit side of the system while FIG. 2B shows the receive side of the system. The transmit half 100A of the system has a sampler module 110 that is used to sample a random data source 120. The sampler module 110 produces pairs of correlated samples from the random data source. Of the pair of correlated samples, the sample X is for the transmit side and this is input to an encapsulation module 130. The encapsulation module 130 produces the symmetric key K as well as the value C (used as a ciphertext). The symmetric key K, along with a message m, is given to an encryption module 140 for encryption. The symmetric key K is used by the encryption module 140 to encrypt the message m to produce the encrypted message m$_e$. The encrypted message m$_e$ is sent, along with the value C, to a transmission module 150 for transmission to a receive side of the system.

In FIG. 2B, the receive side 100B of the system receives the encrypted message m$_e$ and the value C from the transmit half 100A of the system by way of a receive module 200. The receive side 100B also uses the sampler module 110 that, as noted above, produces pairs of correlated samples from the random data source 120. The sample module 110 produces the sample Y for the receive side 100B with sample Y being the second of the pair of correlated samples (with X being the first of the pair and X being produced for the transmit side). This sample Y is sent to a decapsulation module 200. As can be seen, the decapsulation module 200 receives both the sample Y and the value C from the receive module 210. From these two, the decapsulation module 200 recovers/recreates the same symmetric key K as the encapsulation module 130. The symmetric key K is then given to a decryption module 220. The decryption module 220 uses the symmetric key K and the encrypted message m$_e$ (from the receive module 210) and decrypts this encrypted message to produce the message m.

It should be clear that the various modules in FIGS. 2A and 2B may be implemented as purely software modules executing on a single hardware platform or they may be implemented on different hardware platforms, with one hardware platform for the transmit half and one hardware platform for the receive half. Alternatively, one or more modules may be hardware modules configured with specific software such that each module is a specific hardware module configured with software to implement one specific function of the subsystem. As another alternative, one or more modules may be specifically configured hardware (e.g. an ASIC) configured to execute a specific function. It should also be clear that the receive module 200 and the transmission module 150 are communications modules designed and configured to communicate with the other half of the system.

Parameters of the system (such as the keys and the sampled values with correlated randomness from the data set) can be chosen to output a secure key of length, for example, 256 bits. This secure key can then be used to construct a pseudorandom sequence that will be XORed with the message for greater security.

Figure 3A:
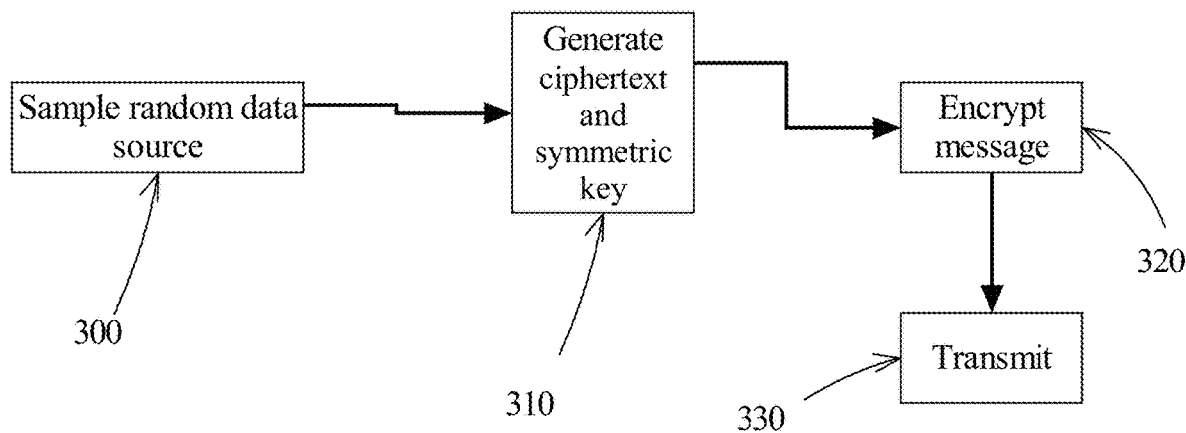
FIG. 3A is a flowchart detailing the steps in a method for encrypting a message according to one aspect of the present invention.
Figure 3B:
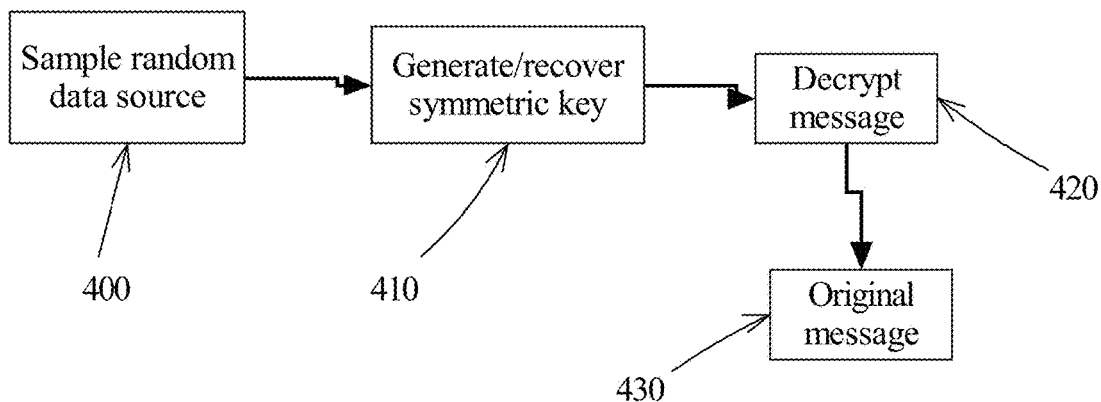
FIG. 3B is a flowchart detailing the steps in a method for decrypting a message as encrypted according to the method in FIG. 3A.

For clarity, the methods embodied in the description above may be summarized in the steps detailed in FIGS. 3A and 3B. FIG. 3A illustrates an encryption method using the above system while FIG. 3B illustrates a decryption method for decrypting messaged encrypted using the method detailed in FIG. 3A.

Referring to FIG. 3A, the encryption method begins at step 300, that of producing a correlated pair of samples from a random data source. The first one of the pair of correlated samples is then used in step 310 to generate a symmetric key and a ciphertext. In step 320, the symmetric key is used to encrypt a message to produce an encrypted message. For step 330, the encrypted message and the ciphertext are transmitted to the receiver, usually at the opposite end of a communications link. It should be clear that, even though step 330 details transmitting both the encrypted key and the ciphertext, this step need not be performed at the same time. The transmission may be performed separately.

Referring to FIG. 3B, the decryption method begins at step 400, that of, obtaining the second of the pair of correlated samples from the random data source generated during the encryption method. The second one of the pair of correlated samples is used in the decryption method and this pair of correlated samples is the same as that used in the encryption method. Once the second one of the pair of samples has been produced, in step 410, the second of the pair of samples is then used, along with the ciphertext received from the opposite end of the communications link, to generate the symmetric key. The symmetric key, the same as the symmetric key generated in the encryption method, is then used to decrypt the encrypted message also received from the opposite end of the communications link (step 420). This results in the original message 430.

As noted above, for a better understanding of the present invention, the following references may be consulted. Each of these references is hereby incorporated in their entirety by reference.

[R1] R. Cramer and V. Shoup, "Design and analysis of practical public-key encryption schemes secure against adaptive chosen ciphertext attack," SIAM Journal on Computing, vol. 33, no. 1, pp. 167-226, 2003.

[R2] P. W. Shor, "Polynomial-Time Algorithms for Prime Factorization and Discrete Logarithms on a Quantum Computer," SIAM Journal on Computing, vol. 26, no. 5, pp. 1484-1509, October 1997.

[R3] Y. Ishai, E. Kushilevitz, S. Meldgaard, C. Orlandi, and A. Paskin-Cherniaysky, "On the power of correlated randomness in secure computation," in Theory of Cryptography Conference. Springer, 2013, pp. 600-620

[R4] U. M. Maurer, "Secret key agreement by public discussion from common information," IEEE Trans. Inf. Theory, vol. 39, no. 3, pp. 733-742, May 1993.

[R5] R. Ahlswede and I. Csiszar, "Common randomness in information theory and cryptography. I. Secret sharing," IEEE Trans. Inf. Theory, vol. 39, no. 4, pp. 1121-1132, July 1993.

[R6] S. Sharifian, A. Poostindouz, and R. Safavi-Naini, "A capacity-achieving one-way key agreement with improved finite blocklength analysis, (in proceedings of isita 2020)," in 2020 International Symposium on Information Theory and Its Applications (ISITA). IEEE, 2020.

[R7] J. Hastad, R. Impagliazzo, L. A. Levin, and M. Luby. Construction of pseudo-random generator from any one-way function. SIAM Journal on Computing, 28(4):1364-1396, 1999.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps.

As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for encrypting and decrypting a message, the encryption method comprising:
   a) sampling a random data source to result in a pair of correlated samples from said random data source;
   b) sending a first one of said pair of correlated samples to an encapsulation module to generate a symmetric key and a ciphertext; and
   c) encrypting said message using said symmetric key to result in an encrypted message;
   wherein the decryption method comprises:
   a1) sending a second one of said pair of correlated samples and said ciphertext to a decapsulation module to recover said symmetric key;
   b1) decrypting said encrypted message using said recovered symmetric key.

2. The method according to claim 1, wherein said encrypting method further includes the steps of:
   d) causing a transmission of said ciphertext to a receiver; and
   e) causing a transmission of said encrypted message to said receiver.

3. The method according to claim 1, wherein said decrypting method further includes a step of: prior to step a1), receiving said encrypted message and said ciphertext.

4. The method according to claim 1, wherein said method is embodied in machine readable and machine executable code stored on a non-transitory computer readable medium wherein, when said machine executable code is executed, said method is implemented.

5. A system for encryption/decryption of a message, the system comprising:
   a random data source sampler for sampling a random data source to produce a pair of correlated samples;
   an encapsulation module for receiving a first one of said pair of correlated samples and for generating a symmetric key and a ciphertext using said first one of said pair of correlated samples;
   a decapsulation module for recovering said symmetric key using said ciphertext and a second one of said pair of correlated samples;
   an encryption module for encrypting said message to produce an encrypted message, said encrypted message being encrypted using said symmetric key;

a decryption module for decrypting said encrypted message, said encrypted message being decrypted using said symmetric key after said symmetric key has been recovered by said decapsulation module.

6. The system according to claim 5, further comprising at least one communications module for transmitting/receiving said messages to and from opposite ends of a communications link.

* * * * *